Dec. 4, 1962     D. W. HOFERER     3,066,532
APPARATUS FOR LOADING A TANK WITH A DESIRED WEIGHT OF LIQUID
Filed April 26, 1957                                2 Sheets-Sheet 2

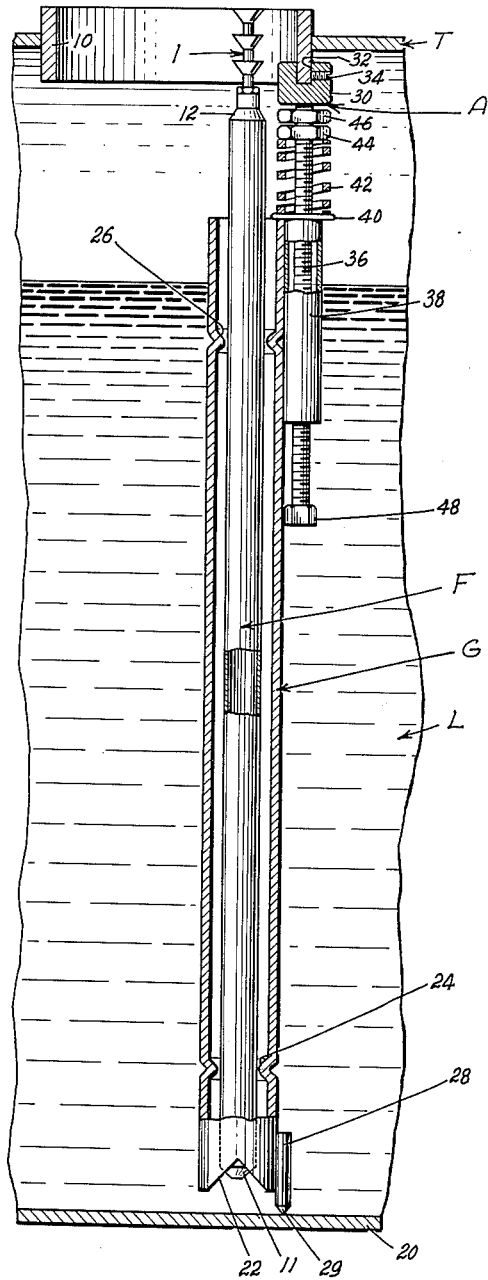
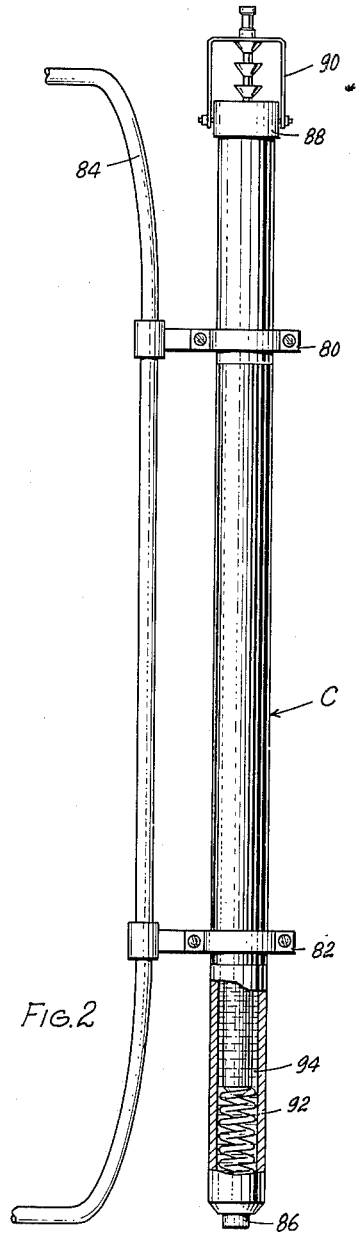
Fig. 1
Fig. 2
DANIEL W. HOFERER
INVENTOR.

DANIEL W. HOFERER
INVENTOR.

BY Fulwider, Mattingly
and Huntley
ATTORNEYS.

United States Patent Office 3,066,532
Patented Dec. 4, 1962

3,066,532
APPARATUS FOR LOADING A TANK WITH
A DESIRED WEIGHT OF LIQUID
Daniel William Hoferer, 3614 Gaviota, Long Beach, Calif.
Filed Apr. 26, 1957, Ser. No. 655,434
9 Claims. (Cl. 73—309)

The present invention relates generally to the field of liquid-containing tanks and more particularly to a novel and improved apparatus for loading a tank with a desired weight of liquid.

It is well known that most, if not all, of the states have laws limiting the load which may be carried by a tank truck or tank trailer. These laws are designed to protect the roadways from damage by overloaded tank trucks or trailers. Although most operators are anxious to conform with such laws, various difficulties are encountered in loading a tank truck or trailer with a desired weight of liquid. In most cases weighing scales are not available for use at the liquid loading site. Accordingly, it is necessary to obtain an approximation of the weight of the liquid by first finding the volume thereof and thereafter computing the weight from such volume when taken in conjunction with the temperature at which the liquid exists and the specific gravity thereof. Inasmuch as the temperature of the liquid being loaded may change during a loading operation or within the varying strata of the load, this method of computing the weight is not always accurate. Additionally, the load may consist of two or more separate liquids, having different specific gravities, and mixed in an unknown proportion.

In patent application Serial No. 529,729 filed by me August 22, 1955, there is disclosed a method and apparatus for loading a tank with a desired weight of liquid which eliminates the difficulties and disadvantages set forth in the preceding paragraph. The apparatus disclosed in this application includes an upright mounting bar mounted within a tank, a float and upper and lower vertically aligned loops affixed to the mounting bar so as support the float means for vertical movement within the tank. The upper end of the float is provided with an upstanding rod element provided with pointer means for indicating the weight of the liquid within the tank. The upper end of this rod carries a plurality of removable weights which are so calibrated as to provide an indication of the desired legal liquid load. Although the aforedescribed apparatus functions satisfactorily under most conditions, the exposed nature of the float subjects it to erratic vertical movement under the influence of turbulence taking place within the liquid held by the tank. Such movement of the float can result in inaccurate readings of the load-indicating pointer unless considerable care is taken in making the readings. Additionally, it has been determined that the exposed position of the calibration weights permits them to be easily pilfered or damaged.

It is a major object of the present invention to provide a novel and improved apparatus for loading a tank with a desired weight of liquid.

Another object of the invention is to provide apparatus of the aforedescribed nature having a guide column positioned within a tank so as to telescopically receive a float, the guide column being open to the liquid within the tank primarily at its bottom portion. Accordingly, the float is shielded from turbulence taking place within the liquid.

A further object is to provide apparatus of the aforedescribed nature wherein the float operates a single load-indicating element that can be employed to designate a plurality of load weights without adjustment.

Yet another object is to provide apparatus of the aforedescribed nature wherein the float is provided with calibrating weights so arranged as to be substantially tamper-proof.

A further object is to provide apparatus of the aforedescribed nature which is simple in design and rugged of construction whereby it may afford a long and useful service life.

Yet another object is to provide apparatus of the aforedescribed nature which may be manufactured and maintained at low cost.

An additional object is to provide a unique carrying tube for use with the float member of the apparatus of the aforedescribed nature.

These and other objects and advantages will become apparent from the following detailed description when taken in conjunction with the appended drawings, wherein:

FIGURE 1 is a side view taken partly in central vertical section and showing a preferred form of apparatus embodying the present invention;

FIGURE 2 is a side elevation taken partly in central vertical section showing a unique carrying tube which may be employed to carry the float member of said apparatus;

Figure 3:
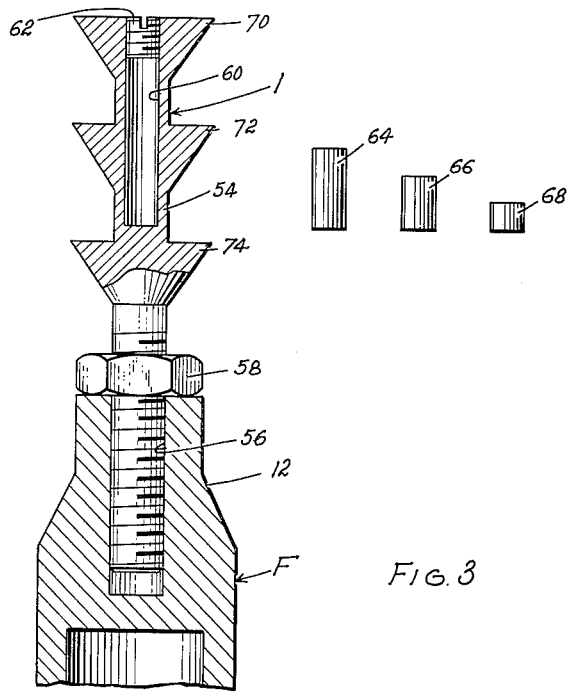
FIGURE 3 is an enlarged view showing the upper portion of said float member.

Referring to the drawings and particularly FIGURE 1 thereof, there is shown a tank T which is to be filled with a desired weight of liquid L by means of the novel apparatus embodying the present invention. The tank T may be that of a conventional tank truck, tank trailer, railroad tank car, or alternately it may represent a stationary tank. The upper portion of the tank T is formed with a filling chute or dome rim 10.

The preferred form of apparatus embodying the present invention includes a float F which is supported for vertical movement within the tank T by means of a tubular guide column G. The upper portion of the tank T is formed with a cylindrical dome rim 10. The guide column G is removably affixed to one side of the dome rim 10 by an attachment member A. The upper end of the float F includes a combined indicator and weight holder member I.

More particularly, the float F is of tubular metallic construction provided at its lower end with a generally frusto-conical bottom closure 11. The upper portion of the float F includes an upper closure 12. The top of this upper closure 12 is secured to the lower end of the indicator and weight holder member I.

The guide column G is also of metallic construction and is of cylindrical configuration. The upper and lower ends of this guide column are open, with the lower end thereof being spaced a short distance above the floor 20 of the tank T. The lower portion of the guide column G may be formed with one or more cut-away openings 22 to facilitate liquid transfer between the tank T and the interior of the guide column. The guide column G is formed at its lower portion with an inwardly necked section 24. A similar inwardly necked section 26 is provided at the upper portion of the guide column. These inwardly necked sections 24 and 26 serve to center the float F relative to the guide column while permitting the float to undergo axial and rotational movement relative to the guide column. An anchor member 28 is rigidly affixed to one side of the bottom portion of the guide column G, in vertical alignment with the attachment member A. This anchor member 28 includes one or more depending spikes 29 engageable with the tank floor 20.

The attachment member A includes a clamp 30 formed with a downwardly extending slot 32 for receiving the lower portion of the dome rim 10. The recess 32 is intersected by a set screw 34 engageable with the exterior surface of the dome rim 10. An externally threaded post 36 depends from the underside of the clamp 30. The intermediate portion of this post 36 extends through an adjustment sleeve 38 that is rigidly affixed to the upper portion of the guide column G. A retainer washer 40 is coaxially arranged over the upper end of the sleeve 38. A coil compression spring 42 encircles the post 38 above the washer 40. The upper end of this spring 42 abuts the underside of a spring adjustment nut 44. A lock nut 46 is carried by the post 36 above the spring adjustment nut 44. The post 36 is free to undergo vertical movement relative to the sleeve 38 in order to compensate for the varying depths of the tanks with which the present apparatus is employed. A safety nut 48 is affixed to the lower end of the rod 36. This safety nut 48 prevents accidental loss of the rod 36 and its attached parts. It should be particularly noted that the downward reaction of the compression spring 42 will be transferred to the tank floor 20 in a substantially vertical line through the spikes 29. In this manner the attachment member A and the spikes 29 will cooperate to rigidly support the guide column G within the tank T.

Referring now to FIGURE 3, the indicator and weight holder member I includes a cylindrical body 54 formed at its lower portion with external threads adapted to be received by a threaded bore 56 formed in the upper portion of the float F. A lock nut 58 is provided between the member I and the float F. With this arrangement, axial adjustment of the indicator and weight holder member I relative to the float F may be readily effected. The upper portion of the body 54 is formed with a coaxial weight-receiving bore 60. The upper end of this bore 60 is threaded to receive a plug 62. A plurality of weights 64, 66 and 68 are adapted to be received by the bore 60. The upper end of the body 54 of the indicator and weight holder I is formed with a generally frusto-conical button 70. A similar button 72 is formed on the body 54 a short distance downwardly of the upper button 70. A third button 74 is formed downwardly of the intermediate button 72. Each of these buttons are imprinted with indicia 76 indicating the poundage of a load to be carried by the tank T.

In using the aforedescribed apparatus to fill the tank T with a desired load, as for example the legal load that may be transported, the tank is initially filled with a suitable reference liquid. The reference liquid will preferably be water although other suitable liquids may be employed. The loading of the reference liquid should be carried out at a temperature at which its weight is known, i.e. sixty degrees Fahrenheit where water is used as a reference liquid. The loading of the reference liquid may take place while the tank T is disposed upon a suitable weighing scale. Alternately, the desired load may be computed by means of the calibration chart for the particular tank T. This calibration chart indicates the exact volume within the tank for any particular liquid elevation therein. Regardless of the manner in which the liquid load is obtained, once the desired weight of reference liquid has been placed within the tank, the float F and its indicator and weight holder member I will rise to a certain height relative to the tank T. Assuming by way of example that the liquid load is 76,800 pounds, the upper end of the top indicator button 70 should be aligned with the upper end of the dome rim 10 when the weight of the liquid L within the tank is equal to 76,800 pounds. In order to obtain this condition it may be necessary to insert one or more of the weights 64, 66 and 68 within the weight receiving bore 60 of the member I. Additionally, the member I may be adjusted axially relative to the top of the float F. Once this condition has been achieved, the lock nut 58 and plug 62 will be tightened. The reference liquid will then be drained from the tank T.

Figure 4:
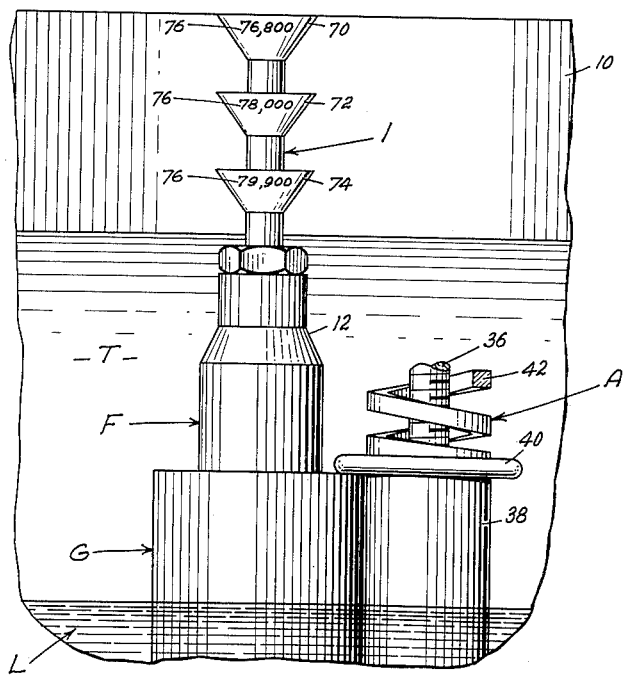
FIGURE 4 is a fragmentary side elevation showing the operation of said apparatus.

Referring now to FIGURE 4, when it is desired to load the tank with a legal load of the liquid to be transported, as for example gasoline, the operator first makes certain that the float F is free to undergo axial and rotational movement relative to the guide column G. Next, the gasoline is loaded into the tank T until it has reached a level which causes the float F and hence the top indicator button 70 to be lifted until the top surface of the button 70 is in horizontal alignment with the upper end of the dome rim 10. Loading of the gasoline is then stopped. It will be apparent that at this time the weight of the gasoline within the tank will equal the weight of the water required to maintain the float F at this level. This will be true regardless of the temperature of the gasoline and regardless of the number of components making up the liquid load. It should also be observed that inasmuch as the float F is shielded relative to the main body of liquid within the tank by the guide column G any turbulence within this liquid will not cause vertical fluctuations of the float. Accordingly, the danger of inaccurate readings is substantially eliminated. Where the tank T is to carry different loads at different times, as for example 78,000 pounds and 79,900 pounds, the intermediate and lower buttons 72 and 74, respectively, of the member I will be aligned with the upper end of the dome rim 10.

It should be noted that the spring 42 of the attachment member A serves to take up any thermal expansion of the guide column G where the tank T is filled with liquid existing at higher temperatures. Accordingly, the guide column and its attached parts will not be subjected to undue strain as a result of this thermal expansion. It should also be observed that the weights 64, 66 and 68 will be protected from tamping, pilferage and loss by virtue of their location within the bore 60 of the indicator and weight holder member I.

Referring now to FIGURE 2 there is shown a unique carrying tube which may be employed to house the float F after the tank has been loaded. This carrying tube C is of cylindrical configuration and is provided with a pair of clamps 80 and 82 for rigidly affixing it to a supporting element 84 of the tank T. The lower end of the carrying tube T is provided with a drainage plug 86. The upper end of the tube T is formed with a collar 88. This collar 88 pivotally supports the bifurcations of an inverted U-shaped carrying handle 90. A coil compression spring 92 is disposed in the lower portion of the tube T. The tube C is adapted to be filled with a liquid solvent 94.

To admit the float F to the carrying tube C, the carrying handle 90 will be pivoted downwardly from its position of FIGURE 2. Thereafter, the carrying handle 90 will be pivoted upwardly to its position of FIGURE 2. In this position, the upper end of the indicator and weight holding member I will be forced into abutment with the center leg of the carrying handle 90 by the spring 92. In this manner, the float F will be protected against damage due to road shocks and the like. Where the carrying tube C is filled with a solvent for the liquid being transported in the tank T, the float F will be cleaned during its stay within the carrying tube. Thus, where the tank T is employed to transport road oil, the carrying tube may be filled with diesel oil.

While there has been shown and described what is presently considered to be the preferred embodiment of the present invention, it will be apparent that various modifications and changes may be made thereto without departing from the spirit of the invention or the scope of the following claims.

I claim:

1. Apparatus for loading a tank having a dome rim with a desired weight of liquid, comprising: a hollow guide member vertically aligned with said dome rim, said guide member being open at its top and bottom; a vertically extending sleeve on said guide member; a threaded post supported by said sleeve for axial movement relative thereto; a clamp engageable with said dome rim on the upper end of said post; an adjustment nut on said post below said clamp; a compression spring interposed between the upper end of said sleeve and said adjustment nut; an anchor member on the bottom of said guide column in substantial vertical alignment with said clamp; a float telescopically disposed within said guide member for vertical movement relative thereto; said guide member shielding said float against liquid turbulence taking place within said tank; and a combined indicator and weight holder member mounted at the upper end of said float so as to be visible and readily accessible from said dome rim.

2. Apparatus for loading a tank having a dome rim with a desired weight of liquid, comprising: an elongated vertically disposed hollow guide member open at its top and bottom portions and in vertical alignment with said dome rim; a vertically extending sleeve on said guide member; a threaded post supported by said sleeve for axial movement relative thereto; a clamp engageable with said dome rim on the upper end of said post; an adjustment nut on said post below said clamp; a compression spring interposed between the upper end of said sleeve and said adjustment nut; an anchor member on the bottom portion of said guide column in substantial vertical alignment with said clamp and having spike means engageable with the tank; an elongated float telescopically disposed within said guide column and free to undergo vertical movement relative thereto, said guide column shielding said float against liquid turbulence taking place within said tank; and a combined indicator and weight holder member mounted at the upper end of said float so as to be visible and readily accessible from said dome rim.

3. Apparatus for loading a tank having a dome rim with a desired weight of liquid, comprising: a hollow guide member vertically aligned with said dome rim, said guide member being open at its top and bottom; a vertically extending sleeve on said guide member; a threaded post supported by said sleeve for axial movement relative thereto; a clamp engageable with said dome rim on the upper end of said post; an adjustment nut on said post below said clamp; a compression spring interposed between the upper end of said sleeve and said adjustment nut; an anchor member on the bottom of said guide column in substantial vertical alignment with said clamp; a float telescopically disposed within said guide member for vertical movement relative thereto; said guide member shielding said float against liquid turbulence taking place within said tank; a combined indicator and weight holder having a body formed at its upper portion with a button alignable with a fixed reference point on said tank so as to provide an indication of the liquid load contained within the tank; said body also being formed with a weight-receiving cavity; and means securing said body to the upper portion of said float and providing vertical adjustment of said body relative to said float.

4. Apparatus for loading a tank having a dome rim with a desired weight of liquid, comprising: an elongated vertically disposed hollow guide member open at its top and bottom portion and vertically aligned with said dome rim; a vertically extending sleeve on said guide member; a threaded post supported by said sleeve for axial movement relative thereto; a clamp engageable with said dome rim on the upper end of said post; an adjustment nut on said post below said clamp; a compression spring interposed between the upper end of said sleeve and said adjustment nut; an anchor member on the bottom portion of said guide column in substantial vertical alignment with said clamp and having spike means engageable with the tank; an elongated float telescopically disposed within said guide column and free to undergo vertical movement relative thereto, said guide column shielding said float against liquid turbulence taking place within said tank; a combined indicator and weight holder having a body formed at its upper portion with a button alignable with a fixed reference point on said tank so as to provide an indication of the liquid load contained within the tank, said body also being formed with a weight-receiving cavity; and means securing said body to the upper portion of said float and providing vertical adjustment of said body relative to said float.

5. Apparatus for loading a tank having a dome rim with a desired weight of liquid; comprising: an elongated vertically disposed hollow guide member vertically aligned with the dome rim and open at its top and bottom; an attachment member on said guide member engageable with said tank adjacent the dome rim; a float telescopically disposed within said guide member for vertical movement relative thereto, said guide member shielding said float against liquid turbulence taking place within said tank; a combined indicator and weight holder having a generally cylindrical body threadably engaged at its lower portion with the upper end of said float so as to be vertically adjustable relative thereto, said body also being formed with a plurality of axially spaced buttons selectively alignable with the upper end of said dome rim so as to provide an indication of the liquid load contained within the tank and said body likewise being formed at its upper portion with a weight-receiving cavity; and a removable plug closing said weight-receiving cavity.

6. Apparatus for loading a tank having a dome rim with a desired weight of liquid, comprising: an elongated vertically disposed hollow guide member open at its top and bottom portion and vertically aligned with the dome rim; an attachment member on the upper portion of said guide column, attachable to said dome rim; an anchor member on the bottom portion of said guide column in substantial vertical alignment with said attachment member and having spike means engageable with the tank; an elongated float telescopically disposed within said guide column and free to undergo vertical movement relative thereto, said guide column shielding said float against liquid turbulence taking place within said tank; a combined indicator and weight holder having a generally cylindrical body threadably engaged at its lower portion with the upper end of said float so as to be vertically adjustable relative thereto, said body also being formed with a plurality of axially spaced buttons selectively alignable with the upper end of said dome rim so as to provide an indication of the liquid load contained within the tank and said body likewise being formed at its upper portion with a weight-receiving cavity; and a removable plug closing said weight-receiving cavity.

7. Apparatus for loading a tank having a dome rim with a desired weight of liquid, comprising: an elongated vertically disposed hollow guide member vertically aligned with the dome rim and open at its top and bottom; a vertically extending sleeve on said guide member; a threaded post supported by said sleeve for axial movement relative thereto; a clamp engageable with said dome rim on the upper end of said post; an adjustment nut on said post below said clamp; a compression spring interposed between the upper end of said sleeve and said adjustment nut; an anchor member on the bottom of said guide column in substantial vertical alignment with said clamp; a float telescopically disposed within said guide member for vertical movement relative thereto, said guide member shielding said float against liquid turbulence taking place within said tank; a combined indicator and weight holder having a generally cylindrical body threadably engaged at its lower portion with the upper end of said float so as to be vertically adjustable relative thereto, said body also being formed with a plurality of axially spaced buttons selectively alignable with the upper end of said dome rim so as to provide an indication of the liquid load contained within the tank and said body likewise being formed at its upper portion with a weight-receiving cavity; and a removable plug closing said weight-receiving cavity.

8. Apparatus for loading a tank having a dome rim with a desired weight of liquid, comprising: an elongated vertically disposed hollow guide member open at its top and bottom portion and vertically aligned with the dome rim; a vertically extending sleeve on said guide member; a threaded post supported by said sleeve for axial movement relative thereto; a clamp engageable with said dome rim on the upper end of said post; an adjustment nut on said post below said clamp; a compression spring interposed between the upper end of said sleeve and said adjustment nut; an anchor member on the bottom portion of said guide column in substantial vertical alignment with said clamp and having spike means engageable with the tank; an elongated float telescopically disposed within said guide column and free to undergo vertical movement relative thereto, said guide column shielding said float against liquid turbulence taking place within said tank; a combined indicator and weight holder having a generally cylindrical body threadably engaged at its lower portion with the upper end of said float so as to be vertically adjustable relative thereto, said body also being formed with a plurality of axially spaced buttons selectively alignable with the upper end of said dome rim so as to provide an indication of the liquid load contained within the tank and said body likewise being formed at its upper portion with a weight-receiving cavity; and a removable plug closing said weight-receiving cavity.

9. Apparatus for loading a tank having a dome rim with a desired weight of liquid, comprising: a hollow guide member being open at its top and bottom; attachment means interposed between the upper portion of said guide column and said dome rim, said attachment means permitting relative vertical movement to take place between said guide column and said dome rim, said attachment means further including a spring to constantly bias said guide column downwardly relative to said dome rim; an anchor member on the bottom of said guide column in substantial vertical alignment with said attachment means; a float telescopically disposed within said guide member for vertical movement relative thereto, said guide member shielding said float against liquid turbulence taking place within said tank; and a combined indicator and weight holder member mounted at the upper end of said float so as to be visible and readily accessible from said dome rim.

References Cited in the file of this patent
UNITED STATES PATENTS

| | | |
|---|---|---|
| 174,240 | Hicks | Feb. 29, 1876 |
| 967,378 | Hillmer | Aug. 16, 1910 |
| 1,853,813 | Horsting | Apr. 12, 1932 |
| 2,067,914 | Godfrey | Jan. 19, 1937 |
| 2,634,608 | Sorber | Apr. 14, 1953 |
| 2,653,478 | Harper | Sept. 29, 1953 |

FOREIGN PATENTS

| | | |
|---|---|---|
| 475,157 | France | Feb. 2, 1915 |
| 796,682 | France | Jan. 27, 1936 |